US012572575B2

(12) United States Patent
Berglund et al.

(10) Patent No.: US 12,572,575 B2
(45) Date of Patent: Mar. 10, 2026

(54) USING LARGE LANGUAGE MODELS TO GENERATE SEARCH QUERY ANSWERS

(71) Applicant: Highspot, Inc., Seattle, WA (US)

(72) Inventors: Kurt William Berglund, Kirkland, WA (US); Md Tanvir Islam Aumi, Redmond, WA (US); Caitlin Rollman, Seattle, WA (US); Timothy Ting, Seattle, WA (US); Sharanya Chandrakantha Rao Inna, Seattle, WA (US); Sai Rahul Reddy Pulikunta, Austin, TX (US); Jinai A, Seattle, WA (US); Xiangfeng Liu, Seattle, WA (US)

(73) Assignee: HIGHSPOT, INC., Seattle, WA (US)

( * ) Notice: Subject to any disclaimer, the term of this patent is extended or adjusted under 35 U.S.C. 154(b) by 0 days.

(21) Appl. No.: 18/679,287

(22) Filed: May 30, 2024

(65) Prior Publication Data

US 2024/0403341 A1 Dec. 5, 2024

Related U.S. Application Data

(60) Provisional application No. 63/505,408, filed on May 31, 2023.

(51) Int. Cl.
*G06F 16/00* (2019.01)
*G06F 16/332* (2019.01)
*G06F 16/334* (2025.01)
*G06F 16/383* (2019.01)

(52) U.S. Cl.
CPC ...... *G06F 16/3344* (2019.01); *G06F 16/3326* (2019.01); *G06F 16/383* (2019.01)

(58) Field of Classification Search
None
See application file for complete search history.

(56) References Cited

U.S. PATENT DOCUMENTS

| | | | |
|---|---|---|---|
| 6,751,600 | B1 | 6/2004 | Wolin |
| 7,814,425 | B1 | 10/2010 | O'Shaugnessy |
| 7,970,721 | B2 | 6/2011 | Leskovec et al. |
| 8,014,634 | B1 | 9/2011 | Chan |
| 8,402,375 | B1 | 3/2013 | Skare |

(Continued)

FOREIGN PATENT DOCUMENTS

| | | |
|---|---|---|
| JP | 2012185780 | 9/2012 |

OTHER PUBLICATIONS

International Search Report and Written Opinion for International Application No. PCT/US2013/076962, Mail Date Apr. 22, 2014, 11 pages.

(Continued)

*Primary Examiner* — Polina G Peach
(74) *Attorney, Agent, or Firm* — McCarter & English, LLP

(57) ABSTRACT

A system generates search query responses based on a content repository that include natural language answers and actions performed based on content items in the repository. The system receives a query associated with the content repository. Based on the query, the system retrieves a set of text chunks that are relevant to the query. At least a portion of the relevant text chunks are sent to a large language model (LLM) to cause the LLM to generate an answer description for the user query, based on the text chunks.

22 Claims, 7 Drawing Sheets

(56) References Cited

U.S. PATENT DOCUMENTS

| | | | |
|---|---|---|---|
| 8,447,760 B1 | 5/2013 | Tong | |
| 8,510,313 B2 | 8/2013 | Vaughan | |
| 8,554,601 B1 | 10/2013 | Marsh | |
| 8,655,709 B2 | 2/2014 | Kumaran | |
| 8,872,804 B2 | 10/2014 | Cummings | |
| 9,727,618 B2 | 8/2017 | Sharp | |
| 9,984,310 B2 | 5/2018 | Hoffman | |
| 10,726,297 B2 | 7/2020 | Hoffman | |
| 10,909,075 B2 | 2/2021 | Sharp | |
| 11,347,963 B2 | 5/2022 | Hoffman | |
| 11,409,752 B1 * | 8/2022 | Qadrud-Din | G06F 40/126 |
| 11,513,998 B2 | 11/2022 | Sharp | |
| 11,620,319 B2 * | 4/2023 | Ramamohan | G06F 16/3338 707/765 |
| 11,861,320 B1 * | 1/2024 | Gajek | G06F 40/40 |
| 11,995,411 B1 * | 5/2024 | Qadrud-Din | G06F 40/40 |
| 12,079,185 B2 * | 9/2024 | Misiewicz | G06F 16/3347 |
| 2002/0091991 A1 | 7/2002 | Castro | |
| 2004/0267700 A1 | 12/2004 | Dumais | |
| 2005/0267799 A1 | 12/2005 | Chan et al. | |
| 2006/0085427 A1 | 4/2006 | D'Urso | |
| 2006/0129538 A1 | 6/2006 | Baader et al. | |
| 2006/0248045 A1 | 11/2006 | Toledano | |
| 2007/0033517 A1 | 2/2007 | O'Shaugnessy | |
| 2007/0079384 A1 | 4/2007 | Grinstein | |
| 2007/0088583 A1 | 4/2007 | Chen | |
| 2007/0088820 A1 | 4/2007 | Kwak | |
| 2007/0150515 A1 | 6/2007 | Brave et al. | |
| 2007/0240203 A1 | 10/2007 | Beck | |
| 2008/0140684 A1 | 6/2008 | O'Reilly | |
| 2008/0154873 A1 | 6/2008 | Redlich | |
| 2008/0306954 A1 | 12/2008 | Hornqvist | |
| 2008/0313716 A1 | 12/2008 | Park | |
| 2009/0019026 A1 | 1/2009 | Valdes-Perez et al. | |
| 2009/0063475 A1 | 3/2009 | Pendse | |
| 2009/0106697 A1 | 4/2009 | Ward | |
| 2009/0164431 A1 | 6/2009 | Zivkovic et al. | |
| 2009/0178144 A1 | 7/2009 | Redlich | |
| 2009/0222551 A1 | 9/2009 | Neely | |
| 2010/0070488 A1 | 3/2010 | Sylvain | |
| 2010/0076274 A1 | 3/2010 | Severson | |
| 2010/0082622 A1 | 4/2010 | Irie | |
| 2010/0146593 A1 | 6/2010 | Stahl | |
| 2010/0198869 A1 | 8/2010 | Kalaboukis et al. | |
| 2010/0235351 A1 | 9/2010 | Iwasa et al. | |
| 2010/0250556 A1 | 9/2010 | Park | |
| 2010/0281389 A1 | 11/2010 | Hutchinson | |
| 2011/0107260 A1 | 5/2011 | Park | |
| 2011/0161362 A1 | 6/2011 | Lipscombe | |
| 2011/0191679 A1 | 8/2011 | Lin | |
| 2011/0225153 A1 | 9/2011 | Haseyama | |
| 2011/0238754 A1 | 9/2011 | Dasilva | |
| 2011/0251875 A1 | 10/2011 | Cosman | |
| 2012/0001919 A1 | 1/2012 | Lumer | |
| 2012/0066645 A1 | 3/2012 | Laurie | |
| 2012/0117475 A1 | 5/2012 | Lee | |
| 2012/0131495 A1 | 5/2012 | Goossens | |
| 2012/0143859 A1 | 6/2012 | Lymperopoulos et al. | |
| 2012/0143880 A1 | 6/2012 | Sweeney | |
| 2012/0158751 A1 | 6/2012 | Tseng | |
| 2012/0191715 A1 | 7/2012 | Ruffner | |
| 2012/0197855 A1 | 8/2012 | Chen | |
| 2012/0271819 A1 | 10/2012 | Qiu et al. | |
| 2012/0278329 A1 | 11/2012 | Borggaard et al. | |
| 2012/0278761 A1 | 11/2012 | John | |
| 2012/0290565 A1 | 11/2012 | Wana | |
| 2012/0290614 A1 | 11/2012 | Nandakumar et al. | |
| 2012/0310926 A1 | 12/2012 | Gannu et al. | |
| 2012/0313948 A1 | 12/2012 | Bergman et al. | |
| 2013/0036114 A1 | 2/2013 | Wong et al. | |
| 2013/0054583 A1 | 2/2013 | Macklem et al. | |
| 2013/0110813 A1 | 5/2013 | Holm et al. | |
| 2013/0124653 A1 | 5/2013 | Vick | |
| 2013/0218923 A1 | 8/2013 | Kaul et al. | |
| 2013/0226995 A1 | 8/2013 | Etheredge | |
| 2013/0254280 A1 | 9/2013 | Yang et al. | |
| 2013/0262588 A1 | 10/2013 | Barak et al. | |
| 2013/0268479 A1 | 10/2013 | Andler | |
| 2013/0297582 A1 | 11/2013 | Zukovsky | |
| 2013/0297590 A1 | 11/2013 | Zukovsky | |
| 2013/0325858 A1 | 12/2013 | Xu | |
| 2014/0006399 A1 | 1/2014 | Vasudevan | |
| 2014/0019497 A1 | 1/2014 | Cidon et al. | |
| 2014/0040246 A1 | 2/2014 | Rubinstein et al. | |
| 2014/0089048 A1 | 3/2014 | Bruich | |
| 2014/0089402 A1 | 3/2014 | Liyanage | |
| 2014/0143057 A1 | 5/2014 | Lessin et al. | |
| 2014/0164338 A1 | 6/2014 | Hickman et al. | |
| 2014/0181204 A1 | 6/2014 | Sharp | |
| 2014/0189516 A1 | 7/2014 | Guo | |
| 2014/0280629 A1 | 9/2014 | Rubinstein et al. | |
| 2014/0359424 A1 | 12/2014 | Lin | |
| 2015/0046528 A1 | 2/2015 | Piepgrass et al. | |
| 2015/0177933 A1 | 6/2015 | Cueto | |
| 2015/0213204 A1 | 7/2015 | Bose | |
| 2015/0309987 A1 | 10/2015 | Epstein | |
| 2016/0042253 A1 | 2/2016 | Sawhney | |
| 2016/0162591 A1 | 6/2016 | Dokania | |
| 2016/0196336 A1 | 7/2016 | Allen et al. | |
| 2016/0231884 A1 | 8/2016 | Plakhov et al. | |
| 2018/0121520 A1 * | 5/2018 | Degiere | H04L 51/04 |
| 2018/0293306 A1 | 10/2018 | Park | |
| 2020/0193153 A1 * | 6/2020 | Lee | G06F 40/226 |
| 2021/0049628 A1 * | 2/2021 | Baird | G06N 3/045 |
| 2021/0056169 A1 * | 2/2021 | Bahirwani | G06N 7/01 |
| 2021/0182496 A1 * | 6/2021 | Shi | G06N 20/00 |
| 2021/0216576 A1 * | 7/2021 | Staub | G06Q 30/0282 |
| 2021/0334300 A1 * | 10/2021 | Banda | G06N 3/08 |
| 2022/0035863 A1 * | 2/2022 | Grewal | G06F 16/9038 |
| 2022/0138170 A1 * | 5/2022 | Misiewicz | G06N 3/09 707/737 |
| 2022/0164397 A1 * | 5/2022 | Escalona | G06F 16/93 |
| 2022/0284234 A1 | 9/2022 | Hoffman | |
| 2022/0327287 A1 * | 10/2022 | Agrawal | G06F 40/216 |
| 2023/0161964 A1 * | 5/2023 | Shah | G06N 3/044 704/9 |
| 2024/0220735 A1 * | 7/2024 | Gray | G06F 40/56 |
| 2024/0281487 A1 * | 8/2024 | Bathwal | G06F 16/9558 |
| 2024/0354436 A1 * | 10/2024 | Mukherjee | G06F 16/3344 |
| 2024/0362286 A1 * | 10/2024 | He | G06F 16/93 |
| 2024/0370339 A1 * | 11/2024 | Statton | G06F 11/1458 |
| 2024/0370479 A1 * | 11/2024 | Hudetz | G06F 16/316 |
| 2024/0406166 A1 * | 12/2024 | Bell | G06N 3/045 |
| 2024/0419695 A1 * | 12/2024 | Matson | G06F 40/40 |
| 2025/0036878 A1 * | 1/2025 | Marwah | G06F 40/30 |

OTHER PUBLICATIONS

International Search Report and Written Opinion for International Application No. PCT/US2014029505, Mail Date Jul. 7, 2014, 11 pages.

Screenshot of main page of Speaker Deck website. Taken Dec. 10, 2014 https://speakerdeck.com/.

Screenshot of Frequently Asked Questions page of Speaker Deck website. Taken Dec. 10, 2014 https://speakerdeck.com/faq#file_types.

* cited by examiner

206

| | | | |
|---|---|---|---|
| User Interface 202 | Query Service 112 | Search Engine 114 | LLM 140 |

Receive Query for Content Item

220

Retrieve Text Chunks with Associated Embeddings Based on Content Item

222

Display the Content Item

224

Generate Set of Questions Based on Query

226

Generate Answer Based on Query and Text Chunks

228

Provide Generated Answer

230

500

USING LARGE LANGUAGE MODELS TO GENERATE SEARCH QUERY ANSWERS

CROSS-REFERENCE TO RELATED APPLICATIONS

This application claims the benefit of U.S. Provisional Patent Application No. 63/505,408, filed May 30, 2023, which is incorporated herein by reference in its entirety.

BRIEF DESCRIPTION OF THE DRAWINGS

Detailed descriptions of implementations of the present invention will be described and explained through the use of the accompanying drawings.

Figure 1:
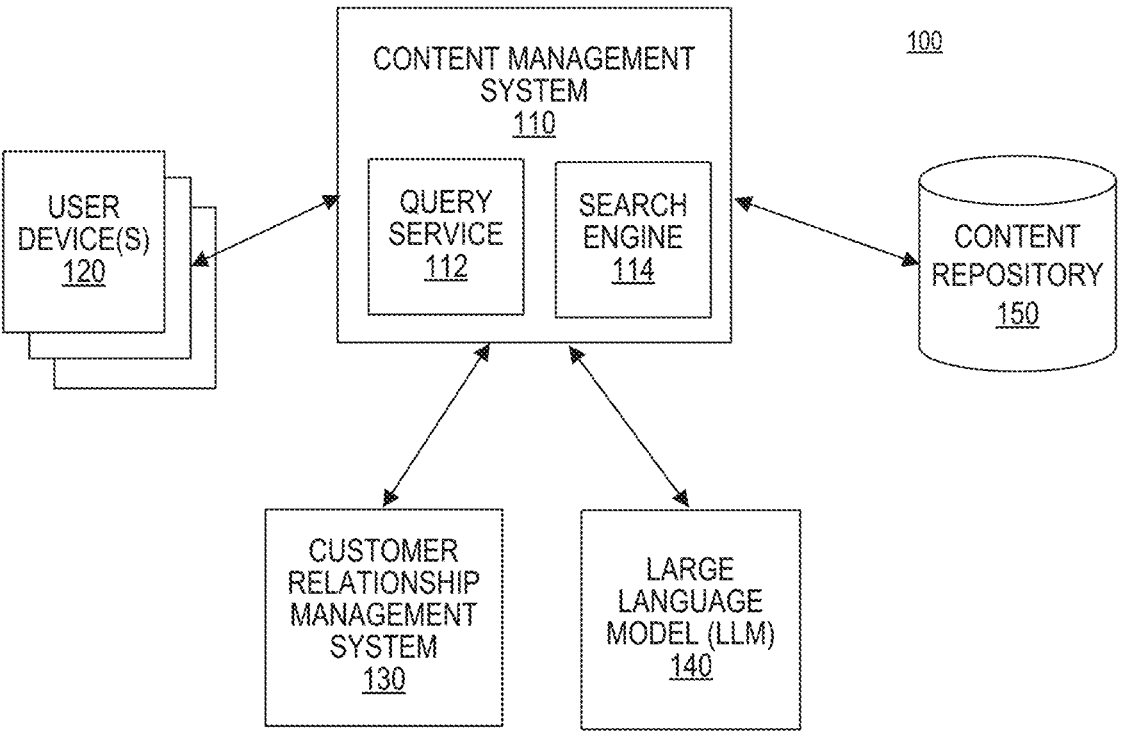
FIG. 1 is a block diagram illustrating an environment in which searches against a corpus of documents are conducted, according to some implementations.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

In the modern digital era, many organizations rely on large content repositories to maintain their digital content. These repositories can accommodate an immense volume of data, encompassing a wide array of formats, from text documents and spreadsheets to multimedia files and more. Search systems are an important aspect of content repositories, enabling users to find information within immense volume of data. Many search systems identify content items that are semantically relevant to a user's search query, returning those content items as search results to the user. The user is then tasked with the responsibility of reading through the results to find an answer to their query. While these systems are effective in providing a broad range of potentially relevant information, they often place a significant burden on the user to sift through the results and extract the desired information.

On the other hand, there are LLM-based systems that aim to alleviate this burden by generating purported answers to user queries. These systems utilize sophisticated language models to understand the user's query and generate a direct response. However, these responses are often generated without any direct relationship to underlying materials, which can lead to answers that lack context or verifiable sources.

To solve these problems and to generate a search system that improves both conventional search techniques and LLM-based chatbot techniques, disclosed herein is a search platform associated with a content management system that combines semantic search and large language models (LLMs) to help users interact with content. When a user submits a search query, the search platform identifies relevant content and leverages the relevant content as a knowledge base or context for an LLM to generate an answer to the search query. For example, users can submit queries such as "What are the top product differentiators for FY 2023?" "Summarize issues faced by the finserv industry and how Company A helps address these issues," or "key takeaways from product overview deck." A semantic search can be performed to identify content that are relevant to the submitted queries. The queries and the relevant content items are sent to the LLM to formulate an answer to the queries based on the content items. The output returned in response to the query can therefore include a portion of text generated by the LLM (such as a bulleted list of key takeaways from a product overview deck), in addition to, or instead of, a list of semantically matched content items.

In some aspects, the techniques described herein include receiving a user query associated with a plurality of content items stored in a content repository maintained by the content management system. A set of text chunks corresponding to the plurality of content items are retrieved, where each text chunk has an associated text embedding. From the set of text chunks, a subset of relevant text chunks is identified based at least in part on similarity between the associated text embeddings and a query embedding that represents the user query. At least a portion of the subset of relevant text chunks are sent to a large language model (LLM) to cause the LLM to generate an answer description for the user query based on the text chunks. The answer description can be returned to the user, optionally with content items themselves that contained the relevant text chunks.

FIG. 1 is a block diagram illustrating an environment 100 in which searches against a corpus of content items are conducted. As shown in FIG. 1, the environment can include a content management system 110, user devices 120, a customer relationship management (CRM) system 130, and a large language model (LLM) 140. The content management system 110 maintains, or is configured to access, a content repository 150 that stores content against which searches can be executed.

The content management system 110 enables access to content items in the content repository. The content management system 110 can provide user interfaces via a web portal or application, which are accessed by the user devices to enable users to create content items, view content items, share content items, or search content items. In some implementations, the content management system 110 includes enterprise software that manages access to a company's private data repositories and controls access rights with respect to content items in the repositories. However, the content management system can include any system or combination of systems that can access a repository of content items, whether that repository stores private files of a user (e.g., maintained on an individual's hard drive or in a private cloud account), private files of a company or organization (e.g., maintained on an enterprise's cloud storage), public files (e.g., a content repository for a social media site, or any content publicly available on the Internet), or a combination of public and private data repositories.

The content repository 150 stores content items such as documents, videos, images, audio recordings, 3D renderings, 3D models, or immersive content files (e.g., metaverse files). Documents stored in the content repository can include, for example, technical reports, sales brochures, books, web pages, transcriptions of video or audio recordings, presentations, or any other type of document. In some implementations, the content management system enables users to add content items in the content repository to a person collection of items. These collections, referred to herein as "spots," can include links to content items in the content repository, copies of items in the content repository, and/or external content items (or links to external content items) that are not stored in the content repository. Users can create spots for their own purposes (e.g., to keep track of important content items), for organizing content items around a particular topic (e.g., to maintain a set of content items that are shared whenever a new client is onboarded), for sharing a set of content items with other users, or for other purposes. In some cases, users may be able to access the spot created by other users.

The content management system 110 can provide interfaces to the user devices 120 to enable users to interact with content in the content repository, such as interfaces that enable users to view, create, modify, or share content items. Alternatively, the content management system 110 maintains a set of APIs that enable other services, such as a native filesystem on a user device, to access the content items in the content repository and facilitate user interaction with the content items.

The content management system 110 can maintain interaction data quantifying how users interact with the content items in the content repository. Interaction data for a content item can include, for example, a number of users who have viewed the item, user dwell time within the item (represented as dwell time in the content item overall and/or as dwell time on specific pages or within particular sections of the content item), number of times the item has been shared with internal or external users, number of times the item has been bookmarked by a user or added to a user's collection of content items (a spot or list), number of times an item has been edited, number of times an item has been clicked/highlighted/otherwise emphasized, type and nature of edits/interaction, areas of content where the user hovered/paid more attention to, etc. When the content repository stores files of a company or organization, the interaction data can be differentiated according to how users inside the company or organization interact with the content and how users outside the company or organization interact with it.

The content management system 110 may integrate with or receive data from external applications on the user device or provided by a third-party service. For example, the content management system 110 may integrate with an electronic communication application, such as an email client, that enables the content management system 110 to generate and send messages via the application. In another example, instead of integrating with a platform that maintains calendar or communication data, the content management system 110 receives calendar or communication data that indicates, for example, the number of times a given sender has communicated with a given recipient, frequency of such communications, nature of such communications, or a number of times the sender and recipient have scheduled meetings.

As shown in FIG. 1, the content management system 110 can include a query service 112 and a search engine 114. Using the query service 112 and search engine 114, the content management system 110 facilitates user searches of the content repository 150 that return answers to the users' queries. The answers output by the content management system can include natural language answers which, for example, directly respond to the query (e.g., answering a user's question as a natural language response, rather than only linking to a content item that contains the answer), or summarize one or more content items (e.g., providing a bulleted list of key points from a slide deck). Answers can also include actions that are performed by the content management system 110, leveraging the LLM 140. For example, an answer can include a new item of content generated in response to a query (e.g., generating a slide deck based on a long document), an action performed on an existing content item to modify the item (e.g., appending one content item to another), or an action performed in an another application or system (e.g., creating an event on a calendar). These answers can be provided instead of or in addition to search results that identify items in the content repository semantically related to the search query. In general, when a search query is received, the content management system identifies content in the content repository that is relevant to the search query. The search query and the relevant content are sent to the LLM 140 to cause the LLM to generate an answer.

In an example use case, the content management system 110 is a sales enablement platform. The platform can store various items that are used by a sales team or their customers, such as pitch decks, product materials, demonstration videos, or customer case studies. Members of the sales team can use the system 110 to organize and discover content related to the products or services being offered by the team, communicate with prospective customers, share content with potential and current customers, and access automated analytics and recommendations to improve sales performance. However, the system 110 can be used for similar purposes outside of sales enablement, including for workplace environments other than sales and for formal or informal educational environments.

The CRM system 130 is a system for managing relationships and interactions with customers and potential customers. For example, a company will use the CRM system 130 to manage the company's sales or marketing efforts. The CRM system 130 can store objects related to entities with which the company has interacted or plans to interact. These objects can include, for example, an account object that stores information about a customer's account, an opportunity object that stores information about a pending sale or deal, or a lead object that stores information about potential leads for sales or marketing efforts.

The LLM 140 can include commercially available, fine-tuned, or custom language models that are configured to perform language analysis and generation tasks in response to prompts received from the content management system 110. Aspects of an example LLM 140 are described with respect to FIG. 4.

Generating Content Embeddings

Figure 2A:
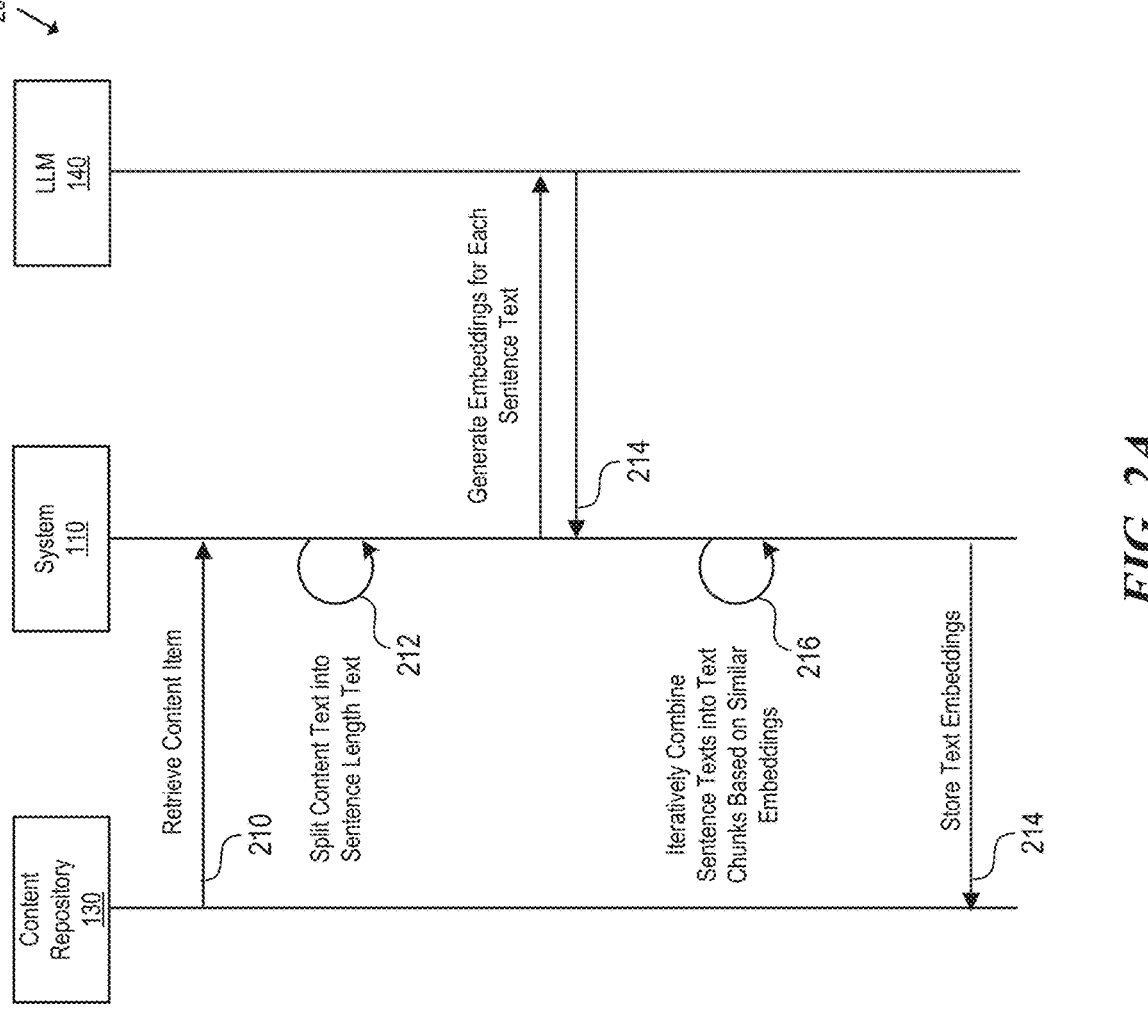
FIG. 2A is an interaction diagram illustrating a process for generating content item embeddings, according to some implementations.

FIG. 2A is an interaction diagram illustrating a process 200 for generating content item embeddings, according to some implementations. As shown in FIG. 2A, the process can include interactions between the content repository 150, the content management system 110, and the LLM 140. Other implementations of the process can include additional, fewer, or different steps, can perform the steps in different orders, and can include steps performed by different entities than shown in FIG. 2A.

At 210, the content management system 110 retrieves a content item from the content repository 150. A content item can be retrieved, for example, upon detecting the content item has been newly added to the content repository or has recently been edited in the content repository.

At 212, the content management system 110 splits text of the content item into sentence-length text. If the content item contains video or audio data, the content management system 110 can generate a text-based transcript of the video or audio data, before slitting the transcript into sentence-length text. In some implementations, instead of or in addition to splitting text by sentences, the system 110 can split the text into portions of other lengths, such as clauses within a sentence or multiple sentences together.

For each of the sentence-length portions of text, the system 110 sends, at 214, the portion to the LLM 140 to generate a sentence embedding that represents the corresponding portion. Embeddings can alternatively be generated by models or algorithmic methods other than the LLM, for example by using techniques such as word2vec.

The system 110 then evaluates similarity of the sentence-length text portions using the embeddings, at 216. When two or more sentence-length text portions have embeddings that are within a similarity threshold, the system 110 can group the similar sentence-length portions into text chunks. For example, the system 110 evaluates sequential sentences within a content item. If one sentence is sufficiently similar to the next sentence, the sentences can be combined into the same text chunk because the sentences are likely to be related to the same topic and/or to one another. As a result, a text chunk can include one or more sentences or a paragraph, or can represent smaller portions of text (e.g., words or phrases). Once a text chunk has been generated, one or more of the sentence embeddings of the sentence-length text portions within a text chunk can be used to represent the text chunk overall. Alternatively, a new embedding can be generated for the text chunk, based on the associated sentence embeddings or based on reapplication of an embedding algorithm to the text chunk.

At 218, the content management system 110 stores the text embeddings associated with the text chunks of the content items in the content repository 150.

Generating Search Query Instant Answers

Figure 2B:
FIG. 2B is an interaction diagram illustrating a process for generating search answers based on the content repository, according to some implementations.

FIG. 2B is an interaction diagrams illustrating a process 206 for generating search answers based on the content repository, according to some implementations. As shown in FIG. 2B, some implementations of the process can include interactions between a user interface 202 displayed on a user device, the query service 112, the search engine 114, and the LLM 140. Other implementations of the process can include additional, fewer, or different steps, can perform the steps in different orders, and can include steps performed by different entities than shown.

Figure 3A:
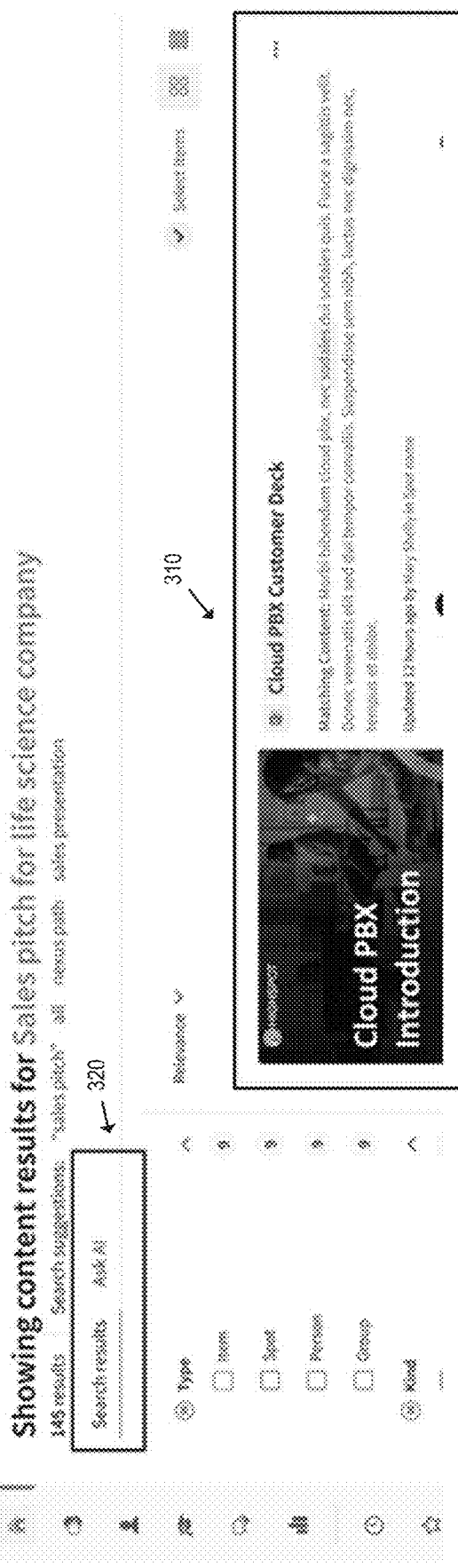
FIG. 3A illustrates an example search user interface.

As shown in FIG. 2B, a user inputs a search query at the user interface 202, which can be displayed on a user device. The search query is received by the query service 112, at operation 220. An example user interface is illustrated in FIG. 3A. In this example, the user has input a search query for "sales pitch for life science company." A search query need not be a typed query; search queries can instead be received, for example, via a voice interface, an eye tracking interface, or a handwriting detection interface.

The query service 112 can process or optimize the query by performing actions such as identifying keywords, removing stopwords, parsing the intent of the query, and so on. Search queries can be semantically analyzed using techniques such as latent semantic analysis or natural language processing algorithms that perform operations, such as relationship extraction, named entity recognition, and the like. The query service 112 can also do specialized operations appropriate for a particular domain or a particular semantic concept. For example, when the query service 112 determines that a search can apply to a set of legal cases, it automatically detects references to legal precedents and searches through them as well as through the case(s) itself. As another example, for a manufacturing use case, the query service 112 identifies that a number was a reference to a part and extends its search to include the supporting information for that particular part.

In some implementations, the query service 112 processes the search query to evaluate a type of output that should be returned in response to the search query. For example, when a search query includes question indicators such as question words (such as "how" or "what") and/or a question mark, the query service 112 predicts that the intent of the user is to receive an answer to a question. When the search query includes action indicators (such as "summarize" or "create"), the query service 112 predicts that the intent of the user is to perform a corresponding action on a content item or corpus. If the search query does not include question indicators or action indicators, the query service 112 may predict that the user is seeking search results (e.g., a list of content items that pertain to keywords in the search query). Such predictions can be made based on programmatic rules (e.g., evaluating whether a query contains certain indicators), or by using a machine learning model that is trained to predict the intent of the query. Similarly, the query service 112 can ask the LLM 140 to evaluate the intent of the query.

At 222, the query service 112 invokes the search engine 114 to retrieve content items or portions of content items that are relevant to the search query and from which the LLM 140 should generate an answer.

For some types of queries or predicted outputs, the query service 112 determines that the query relates to a particular content item. For example, if the predicted type of output is an action related to a specified content item, the query service 112 invokes the search engine 114 to retrieve the specified content item from the repository 150. If the predicted type of output is an answer derived from a corpus of content items, the query service 112 may select portions of the corpus (e.g., the few most relevant content items to the search query, or the most relevant sections of some of the content items) to send to the LLM.

For other types of queries or predicted outputs, the query service 112 invokes the search engine 114 to retrieve a set of one or more relevant content items based on a degree to which the relevant content items match aspects of the search query.

The search engine 114 can match content items to the search queries based on text embeddings of the text chunks within a content item (which can be generated as described with respect to FIG. 2A, for example). For example, the search engine 114 generates an embedding similarity score between a query embedding that represents the search query and a respective text embedding associated with a text chunk. A text chunk can be identified as relevant to the query when its embedding similarity score satisfies a similarity threshold.

In some implementations, the search engine 114 filters content items based on other relevancy criteria, before or after determining similarity between the query and text embeddings. An example relevancy criterion is based on content metadata that can include, for example, an author of a content item, a time stamp indicating when the content item was created or most recently updated, tags or categorization labels applied to the content item, or a description for the content item. The search engine 114 can filter content items in the content repository to identify a set of content items that match an explicit content metadata item that is specified in a search query. The filtered set of content items can then be processed to identify semantic matches to the search query (such as content items with text embeddings that are similar to the query embedding).

Another example relevancy criterion is based on context of a search query. In some implementations, the query service 112 also receives information about a context of the query and passes the context information to the search engine 114 to filter or refine the set of content items that are searched or matched to a search query. The context information can include, for example, an identity of a user who submitted the query, a history of queries recently submitted by the user, or a context in which the query was submitted (e.g., while viewing a particular content item, after accessing a set of content items, after receiving a message that links to or attaches a particular content item, at a certain time of day or time of year, during certain events, etc.). In addition to context of the query itself, the query service 112 may access information about other queries submitted by other users (e.g., users similar to the user who submitted the query) and the context in which these queries were submitted. Instead of or in addition to using the context information to select relevant content items, the query service 112 can send the context information to the LLM 140 as part of a prompt to generate an answer to the search query.

The search engine 114 can further filter content items in the content repository 150 based on user activity data. For example, the search engine 114 searches for content items with which the user who submitted the query recently interacted, content items that are similar to the content items with which the user recently interacted, or content items with which users similar to the querying user recently interacted.

The search engine 114 can furthermore filter content items based on a CRM record maintained by the CRM system 130. For example, the search engine can identify content items that are related to an account object within the CRM 130, prior to semantically matching the search query to text embeddings within the related content items.

In some implementations, the search engine honors access rights of content in the content repository when executing a search. For example, if a particular user does not have access to a particular content item, the search engine does not return the content item to the user as a search result. Similarly, a content item to which a user does not have access may be excluded from a list of content sent to the LLM for generating an answer to the user's queries. However in other cases, depending on access rights associated with each content item, a content item may be used as the knowledge base for the LLM to generate an answer even if the access rights of the content item do not permit the content item itself to be accessed by the user.

Once content items related to the search query have been identified, the query service 112 can send, at 224, a list of the search results to the user interface for display while an answer to the user's search query is generated. The query service 112 can rank content items in the set returned by the search engine 114 before providing the search results to the user interface, for example based on a degree of match between the content item and the query or based on the date of the content items. Additionally or alternatively, the query service 112 can apply additional filters or processing to the set of matching content items, for example to remove duplicate items.

At 226, the query service 112 generates a set of additional queries, based on the query received from the user. In some implementations, the query service 112 identifies other search queries submitted by other users that are similar to the search query being processed. Additionally or alternatively, the query service 112 invokes the LLM 140 or other trained models to generate a list of similar queries. The list of similar search queries can be generated while processing a particular search query or can be generated independently of any particular search query. For example, the LLM 140 can be used to automatically generate a list of queries that are similar to a frequently asked question for a given enterprise, content item, or corpus of content items during downtime between handling active search queries. When a search query is received for processing, some implementations of the query service 112 identify one or more similar queries to submit to the LLM with the original query. The answers generated by the LLM 140 based on each of the submitted queries can be each output to the user or can be filtered by the query service 112 prior to output. For example, if LLM generates the same answer to each of the submitted queries, the query service 112 may output only one answer to the user. Similarly, if one of the answers has a significantly lower confidence score than other answers, the query service 112 may remove the lower-scored answer from the set of answers output to the user.

At 228, the query service 112 sends the LLM 140 a prompt that includes the search query and the text chunks matched to the search query, instructing the LLM 140 to generate an answer to the search query based on the matching text chunks. The prompt can further include the additional questions generated based on the query to improve the query answer generated by the LLM. When the prompt includes the additional questions, the prompt can instruct the LLM to generate a combined answer based on both the original user query and the additional questions, where the combined answer can be returned as the answer to the user query.

The prompt to the LLM 14 can further include context information of the query. For example, the query service 112 retrieves contextual information associated with the user who submitted the search query or the context in which the search query was generated, providing the contextual information to the LLM with the search query and the related content to enable the LLM to generate more customized answers. For example, the query service 112 retrieves a job title of the user and instructs the LLM to "generate an answer for a beginner" or to "generate an answer for a busy executive." In another example, the query service 112 retrieves a history of content accessed, generated, or shared by the user and identifies activity that relates to the content used as the knowledge base for the answer. If, for example, a user recently attached a document entitled "Strategic Framework" to a draft email to a sales prospect and subsequently submitted a search query for "Explain how the strategic framework benefits companies in the life sciences industry," the query service 112 can predict that the user is requesting an introductory sales pitch that is suitable for an email.

Some implementations of the query service 112 select a particular LLM to generate the answer to a received search query. Some models may be better configured to answer more complex queries than other models, or may be better able to generate answers for some types of queries than for other types of queries. For example, when the desired query answer is an action generating a new, non-text-based content item, some LLMs may be configured to produce the desired output while others are configured only to generate text-based outputs. Accordingly, query service 112 service can execute rules to select an LLM for a particular application.

When the LLM returns the query answer, the query service 112 can validate the output from the LLM prior to providing the answer to the user. In some implementations, when the query service 112 receives an answer generated by the LLM based on a set of content, the query service 112 inputs the received answer and the set of content back into the LLM to ask the LLM to confirm that the answer was generated based on or is consistent with the set of content. The query service 112 can instead ask the LLM to perform the same task twice (e.g., sending the search query, a set of relevant content, and instructions to the LLM) at different times, then can compare the outputs generated in response to the two requests. In other implementations, the query service 112 employs multiple LLMs to generate and/or validate answers. For example, after receiving an answer from a first LLM, the query service 112 inputs the search query, the relevant content, and the answer to a second LLM with a request for the second LLM to verify that the answer was derived from the relevant content and answered the search query. In another example, the query service 112 sends a search query and the related content to multiple LLMs in parallel and compares the outputs.

When instructing an LLM to generate an answer to a search query, some implementations of the query service 112 ask the LLM to cite its sources or to indicate when it is confused. These outputs can be further used to validate answers received from the LLM. For example, the query service 112 can ask a second LLM to verify that an answer originated from the source cited by a first LLM. In another example, the query service 112 instructs a second LLM to generate an answer to a search query when a first LLM returned an indication that it was confused by the search query or the related content.

The query service 112 can generate a confidence score for an answer, in some implementations. The confidence score can be generated based on a comparison between the answer and the related content used to generate the answer, based on analysis of the answer itself from the LLM, based on outputs from other LLMs, or a combination thereof. For example, the confidence score can indicate a degree of match between the answer generated by the LLM and the related content, which the query service 112 can generate by identifying a degree of overlap between keywords in the answer and related content, by computing a distance between embeddings that represent the answer and the related content, or by other methods. In another example, the confidence score can indicate a degree of match between multiple answers output by the same LLM or by different LLMs. In still other examples, the query service 112 computes a confidence score based on factors such as whether the LLM cited its sources for an answer, whether the LLM indicated it was confused by a query or the content, length of an answer, or amount of filler or non-substantive content in the answer.

If the confidence score for a given answer is below a specified threshold, the query service 112 may instruct a different LLM to generate the answer. Alternatively, the query service 112 can modify the search query or the prompt to the LLM, or can request additional related content, and input a new request to the LLM to regenerate an answer. For example, the query service 112 performs query disambiguation in which another query that is similar to the original search query is selected and input to the LLM instead of the original search query.

Once the query service 112 has received an answer from an LLM and optionally validated the answer, the query service 112 provides the answer for output to the user, at operation 230 in FIG. 2B. For example, the query service 112 returns text-based answers for display within the user interface 202. If the answer is a generated or modified content item, the query service 112 can provide the content item itself or a link to the content item within the user interface 202. If the answer performed an action within another application, the query service 112 can return a confirmation that the action was performed or will be performed at a predetermined time. The user can provide feedback on the answer, for example to indicate that the user liked/disliked the answer or that the answer was helpful/unhelpful. The feedback can additionally or alternatively include more granular signals, such as the answer not matching what the user was looking for, the answer being confusing, etc. The feedback received from the user can be used by the content management system to improve the operations of the content management system or the LLMs described herein.

To improve efficiency of generating answers to search queries, the content management system 110 can cache or store at least some of the information accessed or generated during the processing of a search query. For example, the content management system 110 can store a set of queries and corresponding answers. When a query similar to one of the stored queries is received, the stored answer can be output instead of requesting a new answer from the LLM. Additionally, some operations described above can be executed in batches during downtime or during slower times. For example, the content management system can use the LLM to asynchronously generate answers to frequently asked questions, such that the answers can be stored and output directly when one of these questions is asked again.

Example: Search Instant Answers

In an example use of the process illustrated in FIG. 2B, a user submits a search query to the content management system that asks the system to generate a natural language answer. For example, the user submits the search query 320 "sales pitch for life science company" depicted in FIG. 3A. In response to this query, the content management system identifies one or more content items 310 that are semantically related to the query (such as the content item "Cloud PBX Customer Deck"). In addition to outputting a list of the semantically related content items for display to the user, the content management system sends the query and the related content items to the LLM to generate an answer. Based on the output of the LLM, the content management system provides a natural language sales pitch to the user.

Example: Corpus Chat

Figure 3B:
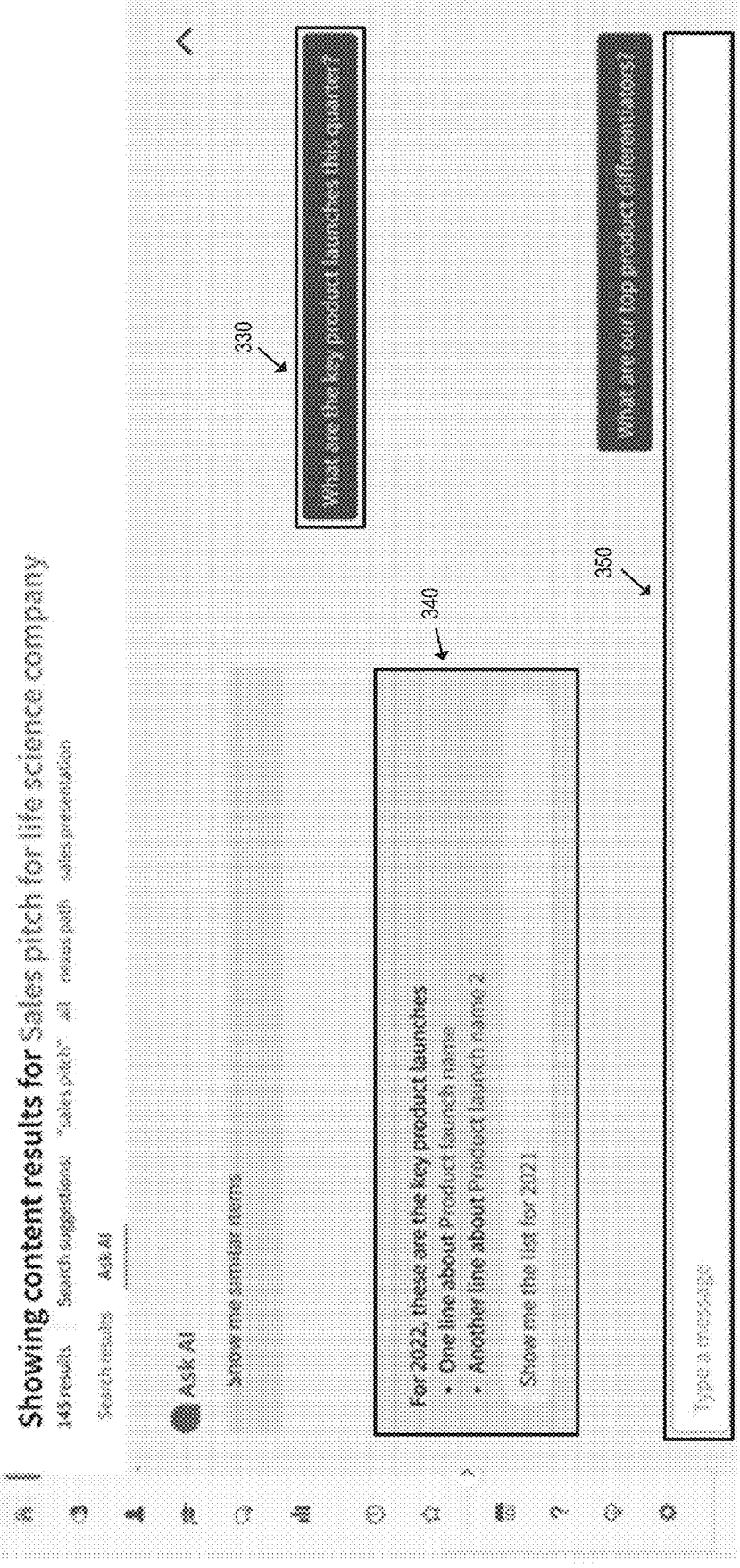
FIG. 3B illustrates an example chat user interface.

FIG. 3B illustrates example search queries submitted in the context of a chatbot conversation associated with a corpus of content items. In the illustrated example, the chatbot is invoked after the user submits an initial search query for "sales pitch for life science company." In response to this query, the content management system retrieves a set of content items from a data repository that are relevant to the initial query (e.g., based on a semantic search). The user can chat with the chatbot, suing a text entry box 350, to ask additional queries 330 related to this set of content items, such as "What are the key product launches this quarter" or "What are our top product differentiators?" For each of these queries, the content management system employs an LLM to generate a response 340 to the query using the set of content items as the knowledge base from which answers are to be derived.

Example: Document Chat

In another example, a user can submit queries related to a specific content item. For example, a document viewer provided by the content management system can include functionality to invoke a chatbot to answer queries related to a document currently being viewed in the viewer. The queries and the viewed document are sent to an LLM to generate answers for output by the chatbot. Such queries can include, for example, "summarize this document and create three questions that evaluate a reader's understanding of it" or "create a sales pitch about this document." In some implementations, queries directed to a particular document can also reference external content, which is retrieved by the content management system before submitting the query to the LLM. For example, a user may ask the chatbot to summarize the differences between a currently viewed version of a document and a previous version of the document.

Transformer for Neural Network

To assist in understanding the present disclosure, some concepts relevant to neural networks and machine learning (ML) are discussed herein. Generally, a neural network comprises a number of computation units (sometimes referred to as "neurons"). Each neuron receives an input value and applies a function to the input to generate an output value. The function typically includes a parameter (also referred to as a "weight") whose value is learned through the process of training. A plurality of neurons may be organized into a neural network layer (or simply "layer") and there may be multiple such layers in a neural network. The output of one layer may be provided as input to a subsequent layer. Thus, input to a neural network may be processed through a succession of layers until an output of the neural network is generated by a final layer. This is a simplistic discussion of neural networks and there may be more complex neural network designs that include feedback connections, skip connections, and/or other such possible connections between neurons and/or layers, which are not discussed in detail here.

A deep neural network (DNN) is a type of neural network having multiple layers and/or a large number of neurons. The term DNN can encompass any neural network having multiple layers, including convolutional neural networks (CNNs), recurrent neural networks (RNNs), multilayer perceptrons (MLPs), Generative Adversarial Networks (GANs), Variational Autoencoders (VAEs), and Auto-regressive Models, among others.

DNNs are often used as ML-based models for modeling complex behaviors (e.g., human language, image recognition, object classification, etc.) in order to improve the accuracy of outputs (e.g., more accurate predictions) such as, for example, as compared with models with fewer layers. In the present disclosure, the term "ML-based model" or more simply "ML model" may be understood to refer to a DNN. Training an ML model refers to a process of learning the values of the parameters (or weights) of the neurons in the layers such that the ML model is able to model the target behavior to a desired degree of accuracy. Training typically requires the use of a training dataset, which is a set of data that is relevant to the target behavior of the ML model.

As an example, to train an ML model that is intended to model human language (also referred to as a "language model"), the training dataset may be a collection of text documents, referred to as a "text corpus" (or simply referred to as a "corpus"). The corpus may represent a language domain (e.g., a single language), a subject domain (e.g., scientific papers), and/or may encompass another domain or domains, be they larger or smaller than a single language or subject domain. For example, a relatively large, multilingual, and non-subject-specific corpus can be created by extracting text from online webpages and/or publicly available social media posts. Training data can be annotated with ground truth labels (e.g., each data entry in the training dataset can be paired with a label) or may be unlabeled.

Training an ML model generally involves inputting into an ML model (e.g., an untrained ML model) training data to be processed by the ML model, processing the training data using the ML model, collecting the output generated by the ML model (e.g., based on the inputted training data), and comparing the output to a desired set of target values. If the training data is labeled, the desired target values may be, e.g., the ground truth labels of the training data. If the training data is unlabeled, the desired target value may be a reconstructed (or otherwise processed) version of the corresponding ML model input (e.g., in the case of an autoencoder), or can be a measure of some target observable effect on the environment (e.g., in the case of a reinforcement learning agent). The parameters of the ML model are updated based on a difference between the generated output value and the desired target value. For example, if the value outputted by the ML model is excessively high, the parameters may be adjusted so as to lower the output value in future training iterations. An objective function is a way to quantitatively represent how close the output value is to the target value. An objective function represents a quantity (or one or more quantities) to be optimized (e.g., minimize a loss or maximize a reward) in order to bring the output value as close to the target value as possible. The goal of training the ML model typically is to minimize a loss function or maximize a reward function.

The training data can be a subset of a larger data set. For example, a data set may be split into three mutually exclusive subsets: a training set, a validation (or cross-validation) set, and a testing set. The three subsets of data may be used sequentially during ML model training. For example, the training set may be first used to train one or more ML models, each ML model, e.g., having a particular architecture, having a particular training procedure, being describable by a set of model hyperparameters, and/or otherwise being varied from the other of the one or more ML models. The validation (or cross-validation) set may then be used as input data into the trained ML models to, e.g., measure the performance of the trained ML models and/or compare performance between them. Where hyperparameters are used, a new set of hyperparameters can be determined based on the measured performance of one or more of the trained ML models, and the first step of training (e.g., with the training set) may begin again on a different ML model described by the new set of determined hyperparameters. In this way, these steps can be repeated to produce a more performant trained ML model. Once such a trained ML model is obtained (e.g., after the hyperparameters have been adjusted to achieve a desired level of performance), a third step of collecting the output generated by the trained ML model applied to the third subset (the testing set) may begin. The output generated from the testing set may be compared with the corresponding desired target values to give a final assessment of the trained ML model's accuracy. Other segmentations of the larger data set and/or schemes for using the segments for training one or more ML models are possible.

Backpropagation is an algorithm for training an ML model. Backpropagation is used to adjust (e.g., update) the value of the parameters in the ML model, with the goal of optimizing the objective function. For example, a defined loss function is calculated by forward propagation of an input to obtain an output of the ML model and a comparison of the output value with the target value. Backpropagation calculates a gradient of the loss function with respect to the parameters of the ML model, and a gradient algorithm (e.g., gradient descent) is used to update (e.g., "learn") the parameters to reduce the loss function. Backpropagation is performed iteratively so that the loss function is converged or minimized. Other techniques for learning the parameters of the ML model can be used. The process of updating (or learning) the parameters over many iterations is referred to as training. Training may be carried out iteratively until a convergence condition is met (e.g., a predefined maximum number of iterations has been performed, or the value outputted by the ML model is sufficiently converged with the desired target value), after which the ML model is considered to be sufficiently trained. The values of the learned parameters can then be fixed and the ML model may be deployed to generate output in real-world applications (also referred to as "inference").

In some examples, a trained ML model may be fine-tuned, meaning that the values of the learned parameters may be adjusted slightly in order for the ML model to better model a specific task. Fine-tuning of an ML model typically involves further training the ML model on a number of data samples (which may be smaller in number/cardinality than those used to train the model initially) that closely target the specific task. For example, an ML model for generating natural language that has been trained generically on publicly available text corpora may be, e.g., fine-tuned by further training using specific training samples. The specific training samples can be used to generate language in a certain style or in a certain format. For example, the ML model can be trained to generate a blog post having a particular style and structure with a given topic.

Some concepts in ML-based language models are now discussed. It may be noted that, while the term "language model" has been commonly used to refer to an ML-based language model, there could exist non-ML language models. In the present disclosure, the term "language model" can refer to an ML-based language model (e.g., a language model that is implemented using a neural network or other ML architecture), unless stated otherwise. For example, unless stated otherwise, the "language model" encompasses LLMs.

A language model can use a neural network (typically a DNN) to perform natural language processing (NLP) tasks. A language model can be trained to model how words relate to each other in a textual sequence, based on probabilities. A language model may contain hundreds of thousands of learned parameters or, in the case of an LLM, can contain millions or billions of learned parameters or more. As non-limiting examples, a language model can generate text, translate text, summarize text, answer questions, write code (e.g., Python, JavaScript, or other programming languages), classify text (e.g., to identify spam emails), create content for various purposes (e.g., social media content, factual content, or marketing content), or create personalized content for a particular individual or group of individuals. Language models can also be used for chatbots (e.g., virtual assistance).

A type of neural network architecture, referred to as a "transformer," can be used for language models. For example, the Bidirectional Encoder Representations from Transformers (BERT) model, the Transformer-XL model, and the Generative Pre-trained Transformer (GPT) models are types of transformers. A transformer is a type of neural network architecture that uses self-attention mechanisms in order to generate predicted output based on input data that has some sequential meaning (i.e., the order of the input data is meaningful, which is the case for most text input). Although transformer-based language models are described herein, it should be understood that the present disclosure may be applicable to any ML-based language model, including language models based on other neural network architectures such as recurrent neural network (RNN)-based language models.

Figure 4:
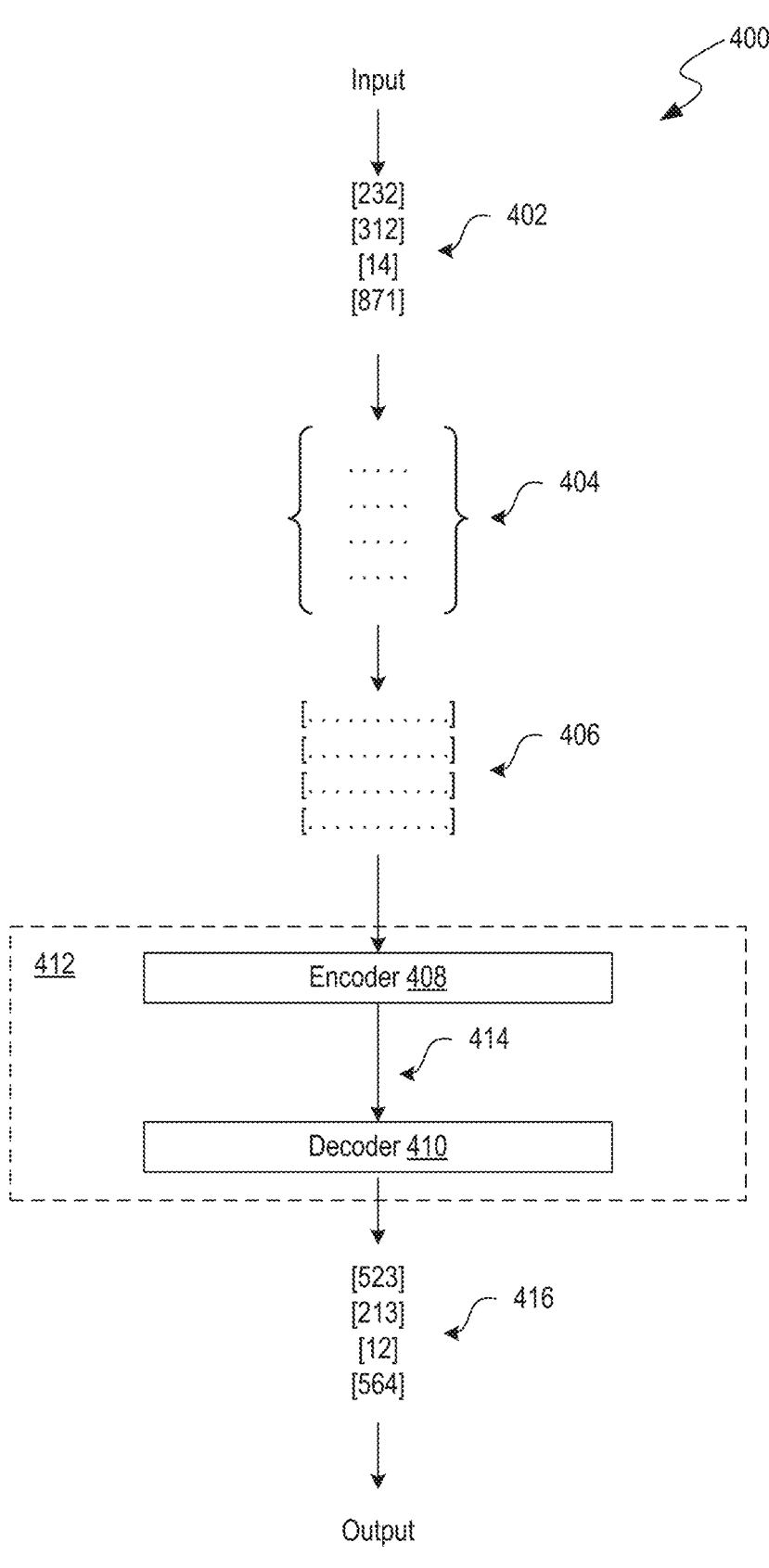
FIG. 4 is a block diagram of a transformer neural network, which may be used in examples of the present disclosure.

FIG. 4 is a block diagram of an example transformer 412. A transformer is a type of neural network architecture that uses self-attention mechanisms to generate predicted output based on input data that has some sequential meaning (e.g., the order of the input data is meaningful, which is the case for most text input). Self-attention is a mechanism that relates different positions of a single sequence to compute a representation of the same sequence. Although transformer-based language models are described herein, the present disclosure may be applicable to any ML-based language model, including language models based on other neural network architectures such as recurrent neural network (RNN)-based language models.

The transformer 412 includes an encoder 408 (which can include one or more encoder layers/blocks connected in series) and a decoder 410 (which can include one or more decoder layers/blocks connected in series). Generally, the encoder 408 and the decoder 410 each include multiple neural network layers, at least one of which can be a self-attention layer. The parameters of the neural network layers can be referred to as the parameters of the language model.

The transformer 412 can be trained to perform certain functions on a natural language input. Examples of the functions include summarizing existing content, brainstorming ideas, writing a rough draft, fixing spelling and grammar, and translating content. Summarizing can include extracting key points or themes from an existing content in a high-level summary. Brainstorming ideas can include generating a list of ideas based on provided input. For example, the ML model can generate a list of names for a startup or costumes for an upcoming party. Writing a rough draft can include generating writing in a particular style that could be useful as a starting point for the user's writing. The style can be identified as, e.g., an email, a blog post, a social media post, or a poem. Fixing spelling and grammar can include correcting errors in an existing input text. Translating can include converting an existing input text into a variety of different languages. In some implementations, the transformer 412 is trained to perform certain functions on other input formats than natural language input. For example, the input can include objects, images, audio content, or video content, or a combination thereof.

The transformer 412 can be trained on a text corpus that is labeled (e.g., annotated to indicate verbs, nouns) or unlabeled. LLMs can be trained on a large unlabeled corpus. The term "language model," as used herein, can include an ML-based language model (e.g., a language model that is implemented using a neural network or other ML architecture), unless stated otherwise. Some LLMs can be trained on a large multi-language, multi-domain corpus to enable the model to be versatile at a variety of language-based tasks such as generative tasks (e.g., generating human-like natural language responses to natural language input).

FIG. 4 illustrates an example of how the transformer 412 can process textual input data. Input to a language model (whether transformer-based or otherwise) typically is in the form of natural language that can be parsed into tokens. The term "token" in the context of language models and NLP has a different meaning from the use of the same term in other contexts such as data security. Tokenization, in the context of language models and NLP, refers to the process of parsing textual input (e.g., a character, a word, a phrase, a sentence, a paragraph) into a sequence of shorter segments that are converted to numerical representations referred to as tokens (or "compute tokens"). Typically, a token can be an integer that corresponds to the index of a text segment (e.g., a word) in a vocabulary dataset. Often, the vocabulary dataset is arranged by frequency of use. Commonly occurring text, such as punctuation, can have a lower vocabulary index in the dataset and thus be represented by a token having a smaller integer value than less commonly occurring text. Tokens frequently correspond to words, with or without white space appended. In some implementations, a token can correspond to a portion of a word.

For example, the word "greater" can be represented by a token for [great] and a second token for [er]. In another example, the text sequence "write a summary" can be parsed into the segments [write], [a], and [summary], each of which can be represented by a respective numerical token. In addition to tokens that are parsed from the textual sequence (e.g., tokens that correspond to words and punctuation), there can also be special tokens to encode non-textual information. For example, a [CLASS] token can be a special token that corresponds to a classification of the textual sequence (e.g., can classify the textual sequence as a list, a paragraph), an [EOT] token can be another special token that indicates the end of the textual sequence, other tokens can provide formatting information, etc.

In FIG. 4, a short sequence of tokens 402 corresponding to the input text is illustrated as input to the transformer 412. Tokenization of the text sequence into the tokens 402 can be performed by some pre-processing tokenization module such as, for example, a byte-pair encoding tokenizer (the "pre" referring to the tokenization occurring prior to the processing of the tokenized input by the LLM), which is not shown in FIG. 4 for brevity. In general, the token sequence that is inputted to the transformer 412 can be of any length up to a maximum length defined based on the dimensions of the transformer 412. Each token 402 in the token sequence is converted into an embedding vector 406 (also referred to as "embedding 406").

An embedding 406 is a learned numerical representation (such as, for example, a vector) of a token that captures some semantic meaning of the text segment represented by the token 402. The embedding 406 represents the text segment corresponding to the token 402 in a way such that embeddings corresponding to semantically related text are closer to each other in a vector space than embeddings corresponding to semantically unrelated text. For example, assuming that the words "write," "a," and "summary" each correspond to, respectively, a "write" token, an "a" token, and a "summary" token when tokenized, the embedding 406 corresponding to the "write" token will be closer to another embedding corresponding to the "jot down" token in the vector space as compared to the distance between the embedding 406 corresponding to the "write" token and another embedding corresponding to the "summary" token.

The vector space can be defined by the dimensions and values of the embedding vectors. Various techniques can be used to convert a token 402 to an embedding 406. For example, another trained ML model can be used to convert the token 402 into an embedding 406. In particular, another trained ML model can be used to convert the token 402 into an embedding 406 in a way that encodes additional information into the embedding 406 (e.g., a trained ML model can encode positional information about the position of the token 402 in the text sequence into the embedding 406). In some implementations, the numerical value of the token 402 can be used to look up the corresponding embedding in an embedding matrix 404, which can be learned during training of the transformer 412.

The generated embeddings 406 are input into the encoder 408. The encoder 408 serves to encode the embeddings 406 into feature vectors 414 that represent the latent features of the embeddings 406. The encoder 408 can encode positional information (i.e., information about the sequence of the input) in the feature vectors 414. The feature vectors 414 can have very high dimensionality (e.g., on the order of thousands or tens of thousands), with each element in a feature vector 414 corresponding to a respective feature. The numerical weight of each element in a feature vector 414 represents the importance of the corresponding feature. The space of all possible feature vectors 414 that can be generated by the encoder 408 can be referred to as a latent space or feature space.

Conceptually, the decoder 410 is designed to map the features represented by the feature vectors 414 into meaningful output, which can depend on the task that was assigned to the transformer 412. For example, if the transformer 412 is used for a translation task, the decoder 410 can map the feature vectors 414 into text output in a target language different from the language of the original tokens 402. Generally, in a generative language model, the decoder 410 serves to decode the feature vectors 414 into a sequence of tokens. The decoder 410 can generate output tokens 416 one by one. Each output token 416 can be fed back as input to the decoder 410 in order to generate the next output token 416. By feeding back the generated output and applying self-attention, the decoder 410 can generate a sequence of output tokens 416 that has sequential meaning (e.g., the resulting output text sequence is understandable as a sentence and obeys grammatical rules). The decoder 410 can generate output tokens 416 until a special [EOT] token (indicating the end of the text) is generated. The resulting sequence of output tokens 416 can then be converted to a text sequence in post-processing. For example, each output token 416 can be an integer number that corresponds to a vocabulary index. By looking up the text segment using the vocabulary index, the text segment corresponding to each output token 416 can be retrieved, the text segments can be concatenated together, and the final output text sequence can be obtained.

In some implementations, the input provided to the transformer 412 includes instructions to perform a function on an existing text. The output can include, for example, a modified version of the input text and instructions to modify the text. The modification can include summarizing, translating, correcting grammar or spelling, changing the style of the input text, lengthening or shortening the text, or changing the format of the text (e.g., adding bullet points or checkboxes). As an example, the input text can include meeting notes prepared by a user and the output can include a high-level summary of the meeting notes. In other examples, the input provided to the transformer includes a question or a request to generate text. The output can include a response to the question, text associated with the request, or a list of ideas associated with the request. For example, the input can include the question "What is the weather like in San Francisco?" and the output can include a description of the weather in San Francisco. As another example, the input can include a request to brainstorm names for a flower shop and the output can include a list of relevant names.

Although a general transformer architecture for a language model and its theory of operation have been described above, this is not intended to be limiting. Existing language models include language models that are based only on the encoder of the transformer or only on the decoder of the transformer. An encoder-only language model encodes the input text sequence into feature vectors that can then be further processed by a task-specific layer (e.g., a classification layer). BERT is an example of a language model that can be considered to be an encoder-only language model. A decoder-only language model accepts embeddings as input and can use auto-regression to generate an output text sequence. Transformer-XL and GPT-type models can be language models that are considered to be decoder-only language models.

Because GPT-type language models tend to have a large number of parameters, these language models can be considered LLMs. An example of a GPT-type LLM is GPT-3. GPT-3 is a type of GPT language model that has been trained (in an unsupervised manner) on a large corpus derived from documents available online to the public. GPT-3 has a very large number of learned parameters (on the order of hundreds of billions), can accept a large number of tokens as input (e.g., up to 2,048 input tokens), and is able to generate a large number of tokens as output (e.g., up to 2,048 tokens). GPT-3 has been trained as a generative model, meaning that it can process input text sequences to predictively generate a meaningful output text sequence. ChatGPT is built on top of a GPT-type LLM and has been fine-tuned with training datasets based on text-based chats (e.g., chatbot conversations). ChatGPT is designed for processing natural language, receiving chat-like inputs, and generating chat-like outputs.

A computer system can access a remote language model (e.g., a cloud-based language model), such as ChatGPT or GPT-3, via a software interface (e.g., an API). Additionally or alternatively, such a remote language model can be accessed via a network such as the Internet. In some implementations, such as, for example, potentially in the case of a cloud-based language model, a remote language model can be hosted by a computer system that can include a plurality of cooperating (e.g., cooperating via a network) computer systems that can be in, for example, a distributed arrangement. Notably, a remote language model can employ multiple processors (e.g., hardware processors such as, for example, processors of cooperating computer systems). Indeed, processing of inputs by an LLM can be computationally expensive/can involve a large number of operations (e.g., many instructions can be executed/large data structures can be accessed from memory), and providing output in a required timeframe (e.g., real time or near real time) can require the use of a plurality of processors/cooperating computing devices as discussed above.

Inputs to an LLM can be referred to as a prompt, which is a natural language input that includes instructions to the LLM to generate a desired output. A computer system can generate a prompt that is provided as input to the LLM via an API. As described above, the prompt can optionally be processed or pre-processed into a token sequence prior to being provided as input to the LLM via its API. A prompt can include one or more examples of the desired output, which provides the LLM with additional information to enable the LLM to generate output according to the desired output. Additionally or alternatively, the examples included in a prompt can provide inputs (e.g., example inputs) corresponding to/as can be expected to result in the desired outputs provided. A one-shot prompt refers to a prompt that includes one example, and a few-shot prompt refers to a prompt that includes multiple examples. A prompt that includes no examples can be referred to as a zero-shot prompt.

Computer System

Figure 5:
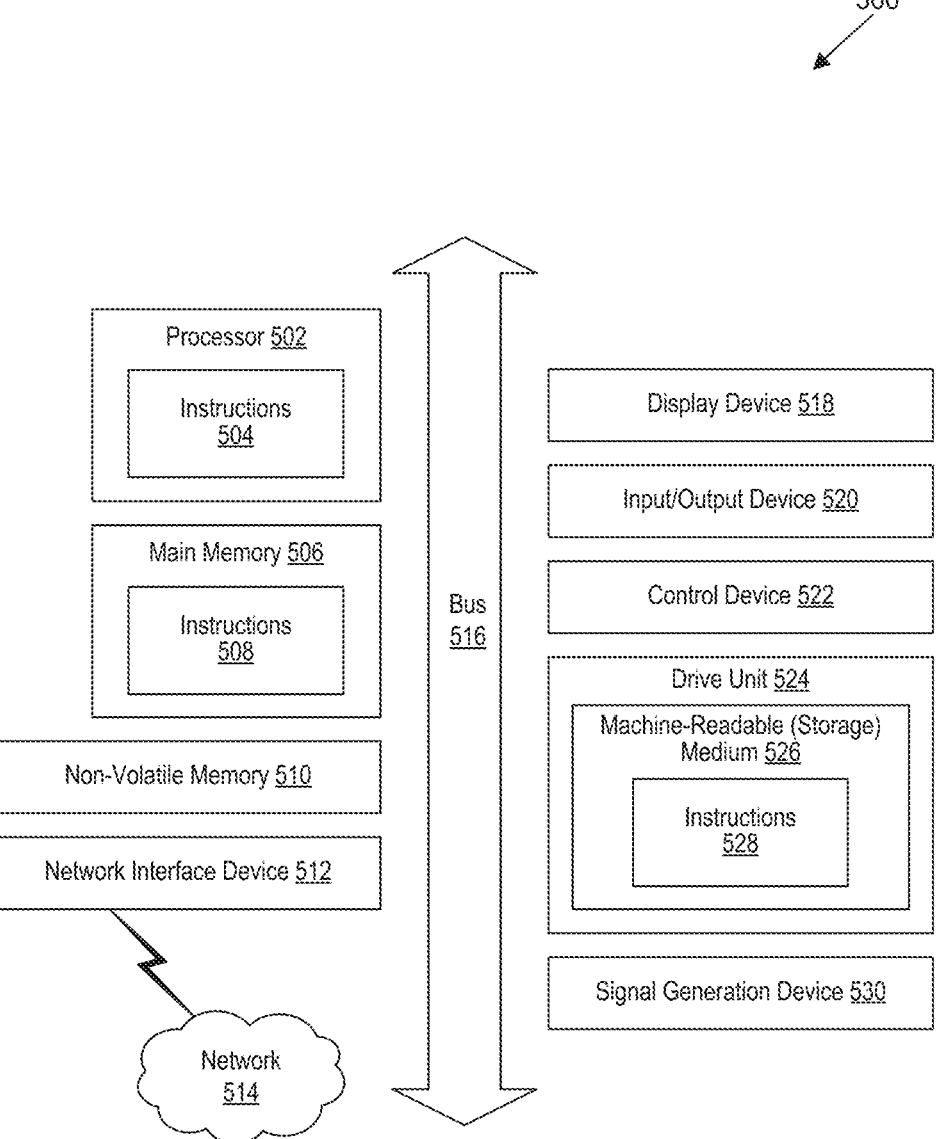
FIG. 5 is a block diagram that illustrates an example of a computer system in which at least some operations described herein can be implemented.

FIG. 5 is a block diagram that illustrates an example of a computer system 500 in which at least some operations described herein can be implemented. As shown, the computer system 500 can include: one or more processors 502, main memory 506, non-volatile memory 510, a network interface device 512, video display device 518, an input/output device 520, a control device 522 (e.g., keyboard and pointing device), a drive unit 524 that includes a storage medium 526, and a signal generation device 530 that are communicatively connected to a bus 516. The bus 516 represents one or more physical buses and/or point-to-point connections that are connected by appropriate bridges, adapters, or controllers. Various common components (e.g., cache memory) are omitted from FIG. 5 for brevity. Instead, the computer system 500 is intended to illustrate a hardware device on which components illustrated or described relative to the examples of the figures and any other components described in this specification can be implemented.

The computer system 500 can take any suitable physical form. For example, the computing system 500 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 500. In some implementation, the computer system 500 can be an embedded computer system, a system-on-chip (SOC), a single-board computer system (SBC) or a distributed system such as a mesh of computer systems or include one or more cloud components in one or more networks. Where appropriate, one or more computer systems 500 can perform operations in real-time, near real-time, or in batch mode.

The network interface device 512 enables the computing system 500 to mediate data in a network 514 with an entity that is external to the computing system 500 through any communication protocol supported by the computing system 500 and the external entity. Examples of the network interface device 512 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 506, non-volatile memory 510, machine-readable medium 526) can be local, remote, or distributed. Although shown as a single medium, the machine-readable medium 526 can include multiple media (e.g., a centralized/distributed database and/or associated caches and servers) that store one or more sets of instructions 528. The machine-readable medium 526 can include any medium that is capable of storing, encoding, or carrying a set of instructions for execution by the computing system 500. The machine-readable medium 526 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 510, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 504, 508, 528) set at various times in various memory and storage devices in computing device(s). When read and executed by the processor 502, the instruction(s) cause the computing system 500 to perform operations to execute elements involving the various aspects of the disclosure.

Remarks

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation.

The applicant reserves the right to pursue such additional claim forms in either this application or in a continuing application.

The invention claimed is:

1. A computer-implemented method, comprising:
   receiving, at a content management system, a plurality of content items to be stored in a content repository maintained by the content management system;
   splitting, with the content management system, text associated with each of the plurality of content items into shortened text sections, wherein the shortened text sections are shorter than the text, and wherein each shortened text section has an associated shortened text embedding;
   evaluating, with the content management system, a similarity of the shortened text embedding of the shortened text sections relative to a similarity threshold;
   if the similarity of the shortened text embedding of the shortened text sections exceeds the similarity threshold, grouping, with the content management system, similar shortened text sections into a text chunk to generate a set of text chunks;
   receiving, by a computer system associated with the content management system, a user query associated with the plurality of content items stored in the content repository maintained by the content management system, wherein the query has a query embedding;
   retrieving, by the computer system, the set of text chunks corresponding to the plurality of content items, wherein each text chunk has an associated text embedding;
   identifying, by the computer system, a subset of relevant text chunks from the set of text chunks based on the associated text embeddings, wherein identifying the subset of relevant text chunks comprises:
      generating, by the computer system, an embedding similarity score between the query embedding corresponding to the user query and the text embedding associated with each text chunk in the set of text chunks; and
      selecting, by the computer system, at least one relevant text chunk from the set of text chunks based on the embedding similarity score for the relevant text chunk being greater than a similarity threshold;
   sending at least a portion of the subset of relevant text chunks to a large language model (LLM) to cause the LLM to generate an answer description for the user query; and
   displaying, by the computer system, the answer description for the user query at a user interface.

2. The computer-implemented method of claim 1, wherein causing the LLM to generate the answer description for the user query comprises prompting the LLM to generate a summary of the subset of relevant text chunks.

3. The computer-implemented method of claim 1, further comprising:
   sending, to the LLM, a prompt that includes the user query and that instructs the LLM to use the user query to generate a set of additional questions related to content of the user query;
   assigning, by the computer system, each question from the set of questions to at least one text chunk from the set of text chunks based on the associated text embeddings;
   sending, to the LLM, a prompt that includes the set of questions, the assigned text chunks, and the associated text embeddings and instructs the LLM to generate a combined answer for the user query; and displaying, by the computer system, the combined answer for the user query at the user interface.

4. The computer-implemented method of claim 1, wherein:
   wherein the associated text chunk of each text chunk is associated with the shortened text embedding of the shortened text sections of the respective text chunk; and
   the method comprises storing, by the computer system, the set of text chunks and the shortened text embedding associated with each of the text chunks.

5. The computer-implemented method of claim 1, wherein the set of text chunks corresponding to the plurality of content items comprises a sentence, a paragraph, a phrase, a word, or a combination thereof.

6. The computer-implemented method of claim 1, wherein the answer description generated by the LLM includes content that includes at least a portion of the set of relevant text chunks for the plurality of content items.

7. The computer-implemented method of claim 1, further comprising:
   filtering, by the computer system, the plurality of content items based on a set of content metadata associated with at least one content item from the plurality of content items,
   wherein filtering the plurality of content items generates a filtered set of content items that match the set of content metadata; and
   wherein retrieving the set of text chunks comprises retrieving a subset of the text chunks that correspond to the filtered set of content items.

8. The computer-implemented method of claim 1, further comprising:
   filtering, by the computer system, the plurality of content items based on a set of user activity data for a user associated with the user query,
   wherein filtering the plurality of content items generates a filtered set of content items that match the set of user activity data; and
   wherein retrieving the set of text chunks comprises retrieving a subset of the text chunks that correspond to the filtered set of content items.

9. The computer-implemented method of claim 1, further comprising:
   filtering, by the computer system, the plurality of content items based on a customer relationship management (CRM) record associated with at least one content item from the plurality of content items,
   wherein filtering the plurality of content items generates a filtered set of content items that are associated with the CRM record; and
   wherein retrieving the set of text chunks comprises retrieving a subset of the text chunks that correspond to the filtered set of content items.

10. A non-transitory computer-readable storage medium storing executable computer program instructions, the computer program instructions when executed by one or more processors of a system causing the system to:
   receive, at a content management system, a plurality of content items to be stored in a content repository maintained by the content management system;
   split text associated with each of the plurality of content items into shortened text sections, wherein the shortened text sections are shorter than the text, and wherein each shortened text section has an associated shortened text embedding;

evaluate a similarity of the shortened text embedding of the shortened text sections relative to a similarity threshold;

if the similarity of the shortened text embedding of the shortened text sections exceed the similarity threshold, group similar shortened text sections into a text chunk to generate a set of text chunks;

receive a user query associated with the plurality of content items stored in the content repository maintained by the content management system;

retrieve the set of text chunks corresponding to the plurality of content items, wherein each text chunk has an associated text embedding;

identify a subset of relevant text chunks from the set of text chunks based on the associated text embeddings, wherein identifying the subset of relevant text chunks comprises:

generating an embedding similarity score between the query embedding corresponding to the user query and the text embedding associated with each text chunk in the set of text chunks; and selecting at least one relevant text chunk from the set of text chunks based on the embedding similarity score for the relevant text chunk being greater than a similarity threshold;

send at least a portion of the subset of relevant text chunks to a large language model (LLM) to cause the LLM to generate an answer description for the user query; and display the answer description for the user query at a user interface.

11. The non-transitory computer-readable storage medium of claim 10, wherein causing the LLM to generate the answer description for the user query comprises prompting the LLM to generate a summary of the subset of relevant text chunks.

12. The non-transitory computer-readable storage medium of claim 10, wherein the computer program instructions when executed by the one or more processors further cause the system to:

send, to the LLM, a prompt that includes the user query and that instructs the LLM to use the user query to generate a set of additional questions related to content of the user query;

assign each question from the set of questions to at least one text chunk from the set of text chunks based on the associated text embeddings;

send, to the LLM, a prompt that includes the set of questions, the assigned text chunks, and the associated text embeddings and instructs the LLM to generate a combined answer for the user query; and display the combined answer for the user query at the user interface.

13. The non-transitory computer-readable storage medium of claim 10, wherein wherein the associated text chunk of each text chunk is associated with the shortened text embedding of the shortened text sections of the respective text chunk; and the computer program instructions when executed by the one or more processors to generate the text chunks corresponding to the content item further cause the system to store the set of text chunks and the shortened text embedding associated with each of the text chunks.

14. The non-transitory computer-readable storage medium of claim 10, wherein the computer program instructions when executed by the one or more processors further cause the system to:

filter the plurality of content items based on a set of user activity data for a user associated with the user query, wherein filtering the plurality of content items generates a filtered set of content items that match the set of user activity data; and wherein retrieving the set of text chunks comprises retrieving a subset of the text chunks that correspond to the filtered set of content items.

15. A data processing system, comprising:

one or more processors; and one or more non-transitory computer-readable storage media storing executable computer program instructions, the computer program instructions when executed by the one or more processors cause the data processing system to:

receive, at a content management system, a plurality of content items to be stored in a content repository maintained by the content management system;

split text associated with each of the plurality of content items into shortened text sections, wherein the shortened text sections are shorter than the text, and wherein each shortened text section has an associated shortened text embedding;

evaluate a similarity of the shortened text embedding of the shortened text sections relative to a similarity threshold;

if the similarity of the shortened text embedding of the shortened text sections exceeds the similarity threshold, group similar shortened text sections into a text chunk to generate a set of text chunks;

receive a user query associated with the plurality of content items stored in the content repository maintained by the content management system;

retrieve the set of text chunks corresponding to the plurality of content items, wherein each text chunk has an associated text embedding;

identify a subset of relevant text chunks from the set of text chunks based on the associated text embeddings, wherein identifying the subset of relevant text chunks comprises:

generating an embedding similarity score between the query embedding corresponding to the user query and the text embedding associated with each text chunk in the set of text chunks; and selecting at least one relevant text chunk from the set of text chunks based on the embedding similarity score for the relevant text chunk being greater than a similarity threshold;

send at least a portion of the subset of relevant text chunks to a large language model (LLM) to cause the LLM to generate an answer description for the user query; and display the answer description for the user query at a user interface.

16. The data processing system of claim 15, wherein causing the LLM to generate the answer description for the user query comprises prompting the LLM to generate a summary of the subset of relevant text chunks.

17. The data processing system of claim 15, wherein the computer program instructions when executed by the one or more processors further cause the system to:

send, to the LLM, a prompt that includes the user query and that instructs the LLM to use the user query to generate a set of additional questions related to content of the user query;

assign each question from the set of questions to at least one text chunk from the set of text chunks based on the associated text embeddings;

send, to the LLM, a prompt that includes the set of questions, the assigned text chunks, and the associated text embeddings and instructs the LLM to generate a combined answer for the user query; and display the combined answer for the user query at the user interface.

18. The data processing system of claim 15, wherein wherein the associated text chunk of each text chunk is associated with the shortened text embedding of the shortened text sections of the respective text chunk; and the computer program instructions when executed by the one or more processors further cause the system to store the set of text chunks and the shortened text embedding associated with each of the text chunks.

19. The data processing system of claim 15, wherein the computer program instructions when executed by the one or more processors further cause the system to:

filter the plurality of content items based on a set of content metadata associated with at least one content item from the plurality of content items, wherein filtering the plurality of content items generates a filtered set of content items that match the set of content metadata; and wherein retrieving the set of text chunks comprises retrieving a subset of the text chunks that correspond to the filtered set of content items.

20. The data processing system of claim 15, wherein the computer program instructions when executed by the one or more processors further cause the system to:

filter the plurality of content items based on a set of user activity data for a user associated with the user query, wherein filtering the plurality of content items generates a filtered set of content items that match the set of user activity data; and wherein retrieving the set of text chunks comprises retrieving a subset of the text chunks that correspond to the filtered set of content items.

21. The computer-implemented method of claim 1, wherein the shortened text sections include at least one of sentence-length text, clauses within a sentence, or two or more sentences together.

22. The computer-implemented method of claim 1, further comprising:

validating the answer generated by the LLM in response to the user query prior to displaying the answer description at the user interface by at least one of:

(i) inputting the answer and the user query back into the LLM for confirmation by the LLM that the answer was generated based on or is consistent with the plurality of content items; or (ii) requesting the LLM to perform determination of the answer to the user query twice at different times and comparing the answer output by the LLM at each of the different times; or (iii) inputting the answer from the LLM and the user query to a second large language model (LLM) to verify the answer from the LLM with a second answer from the second LLM; or (iv) inputting the user query to the LLM and the second LLM in parallel to generate the answer from the LLM and the second answer from the second LLM, and compare the answer and the second answer.

* * * * *